3,418,135
LIGHT-INSENSITIVE MALT BEVERAGE AND PROCESS OF PRODUCING THE SAME
Peter D. Bayne, Milwaukee, Wis., assignor to Jos. Schlitz Brewing Company, Milwaukee, Wis., a corporation of Wisconsin
No Drawing. Filed Sept. 30, 1964, Ser. No. 400,580
6 Claims. (Cl. 99—31)

ABSTRACT OF THE DISCLOSURE

The invention relates to a process for producing a light insensitive malt beverage by reducing the isohumulones of the hop constituents by use of an alkali metal dithionite.

---

This invention relates to a process of producing a malt beverage such as beer, and more particularly to a process of producing a malt beverage which is insensitive to light.

Malt beverages such as beer and ale are not stable to light. When subjected to light, the beer develops an odor and flavor characterized as "skunky." To prevent the development of the sunstruck or skunky odor, beer is generally packaged in colored bottles which minimizes exposure to sunlight. Even though packaged in colored bottles or in cans or kegs, the beer can nevertheless develop the sunstruck odor by virtue of the short exposure to sunlight in drinking glasses.

It has been found that the presence of isohumulones are responsible for the development of the sunstruck odor in beer. The hops, which are boiled with the wort, contain resins and oils which are contained in the lupulin. The resins include the alpha and beta resins, with the alpha resins containing a bitter acid called humulone and the beta resins containing an acid called lupulone. The alpha acids provide the bitter flavor for the beer while the beta acids have low solubility in the wort and do not appreciably enter into the brewing process.

During the brewing process, the humulone fraction is isomerized to the corresponding isohumulones. The sunstruck odor substance in beer has been identified as a mercaptan,3-methyl-2-butene-1-thiol, which is formed by the photolysis of the six-membered side chain on the isohumulone molecule. The free radical formed by the intervention of sunlight splits off carbon monoxide, forming the 3-methyl-2-butenyl radical. This product, in turn, reacts with hydrogen sulfide, which is formed from proteins or amino acids by photochemical action, to form 3-methyl-2-butene-1-thiol. This mercaptan is considered to be the main component of the sunstruck odor in malt beverages.

To prevent the sunstruck odor, it has been proposed to convert a carbonyl group of the isohumulones into a secondary alcohol by reduction. In this reduced form, the molecule becomes insensitive to sunlight and there is no formation of odor on exposure to sunlight. This conversion has been carried out in the past by use of sodium borohydride as disclosed in Patent No. 3,079,262, but the use of sodium borohydride has not been completely successful in that the reaction is difficult to control. The contact time between the sodium borohydride and the isohumulone must be accurately controlled in order to effect a complete reduction of the isohumulones. In addition, the sodium borohydride is a relatively costly material which adds to the overall cost of the beer.

The present invention is directed to a process for producing a light-insensitive malt beverage by reducing the isohumulones by use of an alkali metal dithionite. More specifically, the process consists of initially extracting ground hops with a solvent, such as hexane. The solvent is then evaporated, leaving a dark resinous oil which is isomerized in a dilute alkaline solution. After the isomerization, the material is neutralized to pH of 6.0 to 7.0 with a mineral acid and the lupulone, wax and chlorophyll are removed by further extractions with a solvent. The aqueous phase is then further acidified to a pH in the range of 1.0 to 2.0 and the isohumulones extracted with a solvent such as diethyl ether. The reduction is then accomplished by contacting the ether-isohumulone extract with an aqueous solution of sodium dithionite.

After the reduction, the reduced isohumulone extract is separated from the dithionite solution and washed with brine. The ether is then removed by distillation to produce the reduced isohumulone concentrate.

The reduced isohumulone when added to a standard unhopped wort or beer produces a beer which does not develop the characteristic sunstruck odor when subjected to sunlight and at the same time allows precise control of the isohumulone bitterness levels which was hitherto impossible by traditional hopping methods.

Other objects and advantages will appear in the course of the following description.

The ground hops are initially extracted with solvents, such as diethyl ether, petroleum ether, methylene chloride, chloroform, hexane or the like. The temperature of the extraction is not critical and is generally carried out at room temperature. For most operations, the extraction time will be in the neighborhood of about two hours with the precise time depending on the volume of the solvent and the amount and type of the hops employed.

The solvent extract contains both humulone and lupulone in addition to hop wax and chlorophyll, which are also present in significant amounts, and is substantially free of proteins and tannins. The mass is then filtered and the cake is washed with further quantities of the solvent. The solvent extracts are combined and evaporated to dryness in vacuo leaving a dark resinous oil.

The resinous oil, containing the humulones, is isomerized by boiling the oil with a dilute alkaline solution. The alkaline solution may take the form of a water solution of an alkali metal carbonate, such as sodium or potassium carbonate, or an alkali metal hydroxide, such as sodium or potassium hydroxide. Generally, a period of about ½ hour will result in the complete isomerization of the humulones.

While the boiling is being carried out, the essential hop oils are recovered by use of an oil trap. This permits the hop oils to be recovered from the extract before oxidation can influence the oils. Subsequently, the hop oil may be returned to the beer with the reduced isohumulone extract, in order to more closely reproduce hop character in the beer or ale.

The reaction mixture which generally has a pH of about 10.5 is then cooled in ice and the cooled mixture is then adjusted to a pH of 6.0 to 7.0 by the addition of a mineral acid such as hydrochloric acid, sulphuric acid, or the like. Following the neutralization, the mixture is again extracted with a solvent, such as petroleum ether, hexane or any of the other solvents previously mentioned. The solvent extraction at this pH serves to dissolve the lupulone, hop wax and chlorophyll and other contaminants. The solvent extract is discarded.

Following the solvent extraction, the aqueous phase is then adjusted to a pH below 3.0 by the addition of any suitable mineral acid such as hydrochloric acid, sulphuric acid or the like. The pH at this point should be below 3.0 and preferably below 2.0. The isohumulones are then extracted from the aqueous phase by use of a solvent such as diethyl ether, petroleum ether, hexane or any of the other solvents previously mentioned, and the aqueous phase is discarded.

The reduction of the isohumulones is accomplished by contacting the ether-isohumulone extract with an aqueous solution of an alkali metal dithionite, such as sodium or potassium dithionite. A molar ratio of isohumulone to dithionite of about 1:2 is preferably used and the mixture is agitated by shaking or mixing to provide a complete reduction of the isohumulone. The period of contact between the dithionite and the isohumulone is not critical and generally a period of about 10 minutes is sufficient to provide a complete reduction.

The reduced isohumulone extract is separated from the aqueous dithionite solution in a separatory funnel and washed with brine. The ether is then removed by distillation in vacuo and the residue is taken up in ethanol. The reduced isohumulones are stable in the ethanol solvent and the concentration of the isohumulone can be readily determined by ultra-violet spectroscopy so that an accurate amount of the isohumulone extract can be added to an unhopped beer. In general, the over-all yield of reduced isohumulone prepared in accordance with the process of the invention is in the range of 60 to 75% of theoretical yield.

The addition of the reduced isohumulone extract to unhopped beer prevents the development of the sunstruck odor and enables the beer to be stored in clear glass bottles or to be subjected to sunlight for substantial periods of time without development of the skunky odor. In addition, the reduced isohumulones produce the same bitterness characteristics as the normal substance and no deleterious flavor characteristics are imparted by use of the isohumulones produced by the process.

A specific example of the process of the invention is as follows:

Extraction 40 grams of 1961 Idaho seedless hops containing 2.482 grams humulone and 1.312 grams lupulone were ground to a fine meal in an electric meat grinder. The ground hop meal was then extracted with 800 ml. of petroleum ether for 2 hours in a Waring Blender. The mass was then filtered and the cake washed with 1x 450 ml. of petroleum ether. The extracts were then combined and evaporated to dryness in vacuo using a rotary evaporator at water pump pressures. The evaporated extract was a viscous oil.

Isomerization

The viscous oil was refluxed in 500 ml. of .01N $K_2CO_3$ for 30 minutes. The essential hop oils present in the extract were collected with an oil trap set below the reflux condenser. The reaction mixture was cooled in ice and poured into 140 grams of ice. The temperature of this mixture was 5° C. and the pH was 10.5. The cooled mixture was then adjusted in pH to a value of 6.45 with 23 ml. of 6 N Hcl. and extracted with 3× 170 ml. petroleum ether. The organic extracts were discarded.

Reduction and extraction of isohumulone

The aqueous phase was then adjusted to a pH of 2.0 with 20.5 ml. of 6 N Hcl. and extracted with 3× 170 ml. petroleum ether. The extracts were combined and washed with 4× 170 ml. saturated brine and then dried by filtration through sodium sulphate. The petroleum ether extract was then evaporated to dryness in vacuo and the residue taken up in a small amount of ethanol. The residual petroleum ether was removed by azeotropic distillation with ethanol. The ethanol was evaporated and the residue was taken up in 150 ml. of 95% ethanol. Spectrophotometric analysis indicated a yield of 1.60 grams of isohumulone which was 64.5% of theoretical yield.

50 ml. of the isohumulone extract containing 800 mg. isohumulone (0.00221 mole) was evaporated and taken up in 15 ml. of diethyl ether and then shaken with 770 m. (0.00442 mole) of sodium dithionite in 15 ml. of water for 10 minutes in a separatory funnel. The aqueous layer was subsequently discarded and the ether extract was washed with 2× 15 ml. of saturated brine, and the ether layer evaporated to dryness. The reduced isohumulone residue was taken up in ethanol and adjusted to give a 50 ml. solution. The yield by spectrophotometric analysis was 570 mg. or 73% of theoretical yield.

Testing for light sensitivity

An unhopped wort was taken from the brew kettle and boiled for the appropriate length of time without hops. This unhopped wort was fermented, stored, filtered and bottled in the conventional manner except that clear flint bottles were used. To ascertain whether the unhopped beer was free of isohumulones it was exposed to sunlight and it showed no sun sensitivity. Spectrophotometric analysis indicated that isohumulones were not present.

0.387 ml. of the ethanol solution of the reduced isohumulones was added to one portion of the unhopped beer while 0.300 ml. of isomerized, but not reduced, isohumulone was added to a second portion of the unhopped beer, giving a concentration of 12.5 p.p.m. isohumulone to both beers. Both beers were exposed to sunlight for one hour and then poured. The beer containing the reduced isohumulone of the invention was free of sun struck odor while the beer containing the non-reduced isohumulone had a very strong sunstruck odor.

Various modes of carrying out the invention are contemplated as being within the scope of the following claims particularly pointing out and distinctly claiming the subject matter which is regarded as the invention.

I claim:

1. A method of treating humulones to render the same photochemically non-reactive when present in a fermented malt beverage, comprising the steps of converting the humulone to isohumulone, chemically reducing the isohumulone with sodium dithionite, and separating the reduced isohumulone from the reaction mixture.

2. A method of treating humulones to render the same photochemically non-reactive when present in a fermented malt beverage, comprising the steps of converting the humulone to isohumulone, reacting the isohumulone with an alkali metal dithionite for a period of time sufficient to reduce the isohumulone, and separating the reduced isohumulone from the reaction mixture.

3. A method of treating humulones to render the same non-reactive to sunlight when present in a malt fermented beverage, comprising the steps of converting the humulones to isohumulones by reacting the humulones with an alkaline aqueous solution, removing the lupulones from said aqueous solution, adjusting the pH of said aqueous solution to a value less than 3.0, extracting the isohumulones from said aqueous solution, contacting the isohumulone extract with an aqueous solution of an alkali metal dithionite to reduce said isohumulones, and thereafter removing the reduced isohumulones from the reaction mixture.

4. A method of treating humulones to render the same photochemically non-reactive when present in a fermented malt beverage, extracting the hop constituents from ground hops with a solvent for the hop constituents, said hop constituents containing substantial amounts of humulone and lupulone, removing the hop constituents from the solvent, isomerizing the humulone to isohumulone in an aqueous alkaline solution, adjusting the pH of the solution to a value of 6.0 to 7.0, extracting the lupulone from the solution with a solvent in which said lupulone is substantially soluble, adjusting the pH of the solution to value less than 3.0, extracting the isohumulone from the solution with a solvent in which said isohumulone is substantially soluble, reacting the isohumulone with an alkali metal dithionite to reduce the isohumulone, and separating the isohumulone from the reaction mixture.

5. In a method of preparing a malt beverage which is insensitive to sunlight, the steps of preparing a wort, fermenting the wort and recovering the resulting beverage, and adding to the beverage an effective amount of a hop extract containing alkali metal dithionite reduced isohumulone.

6. In a method of preparing a malt beverage which is insensitive to sunlight, the steps of preparing a wort, fermenting the wort and recovering the resulting beverage, and adding to the beverage an effective amount of a bittering agent derived from hops and containing a substantial proportion of sodium dithionite reduced isohumulone.

References Cited

UNITED STATES PATENTS 3,044,879 7/1962 Koch et al _____ 99—50.5
3,079,262 2/1963 Hougen _____ 99—50.5
3,155,522 11/1964 Hildebrand et al. ____ 99—50.5

OTHER REFERENCES

Stone, I., "The Dithionite Ascorbate Complex as an Antioxidant for Beer." Wallestein Advances in Beer Quantity—Part-I, Walletstein Laboratories Communications, vol. XXIV, No. 84, Aug. 1961.

A. LOUIS MONACELL, *Primary Examiner.*

D. M. NAFF, *Assistant Examiner.*

U.S. Cl. X.R.

99—50, 5; 260—586